July 16, 1935. W. J. DONOVAN ET AL Re. 19,644

PROTECTOR FOR PIES OR OTHER COMMODITIES

Original Filed Dec. 2, 1933

WITNESSES

Edw. Thorpe

A. L. Kitchin

INVENTORS

William John Donovan

Charles Edward Donovan

Munn, Anderson, Starke, Foster & Liddy

ATTORNEYS

Reissued July 16, 1935 Re. 19,644

UNITED STATES PATENT OFFICE 19,644

PROTECTOR FOR PIES OR OTHER COMMODITIES

William John Donovan and Charles Edward Donovan, New Rochelle, N. Y.

Original No. 1,978,296, dated October 23, 1934, Serial No. 700,724, December 2, 1933. Application for reissue February 23, 1935, Serial No. 7,930

11 Claims. (Cl. 206—44)

This invention relates to an improved package for protecting pies and other commodities, the object being to provide a construction which will receive a desired commodity and which thereafter may be stacked without injury to the commodity.

Another object of the invention is to provide a package for protecting and supporting an article or commodity, as, for instance, a pie, the structure being such that the pie or other commodity is supported against being engaged by anything at the top or bottom.

Another object of the invention is to provide a support and protection for pies and other commodities wherein the pie or other commodity is suspended so that it will not touch anything at the top or bottom and at the same time will be completely enclosed so as to be protected against foreign matter.

A still further object of the invention, more specifically, is to provide a package so formed as to support in a suspended manner a pie or other commodity, and at the same time present means whereby a number of packages may be stacked one on the other without any pressure on the pie or other commodity.

An additional object of the present invention is to provide a package having means whereby Cellophane or other suitable material may be stretched across and above the commodity being protected without touching the commodity.

In the accompanying drawing—

Figure 1:
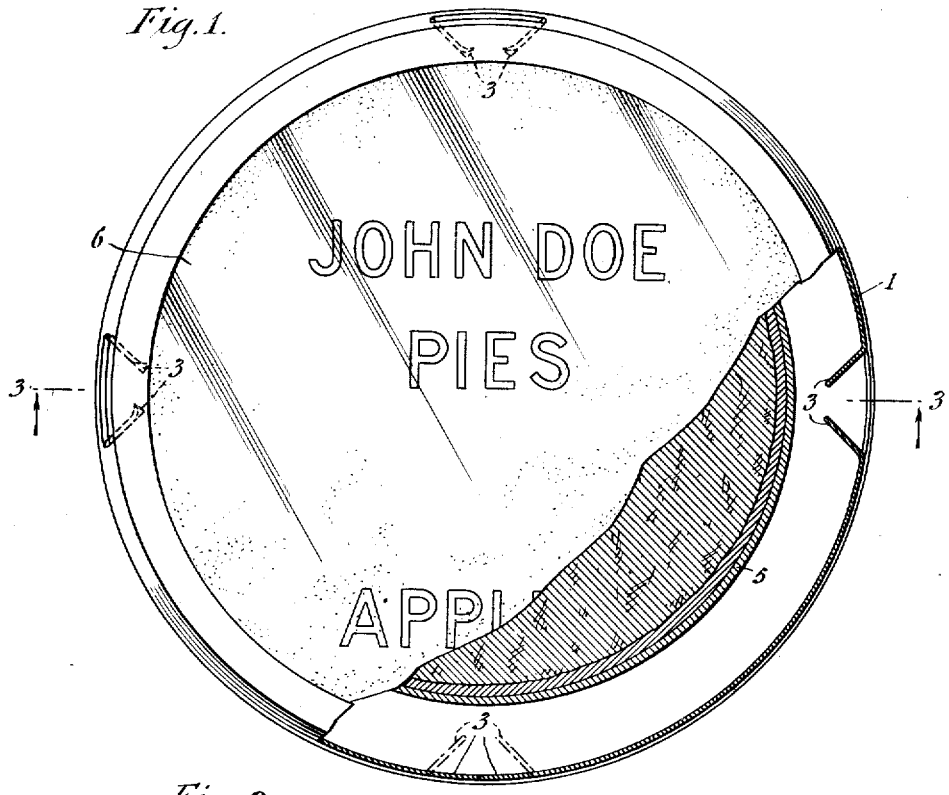
Figure 1 is a top plan view of a package disclosing an embodiment of the invention, the same being broken away at one part to illustrate certain detailed features, the section forming the broken part being taken on the line 1—1 of Figure 3.
Figure 2:
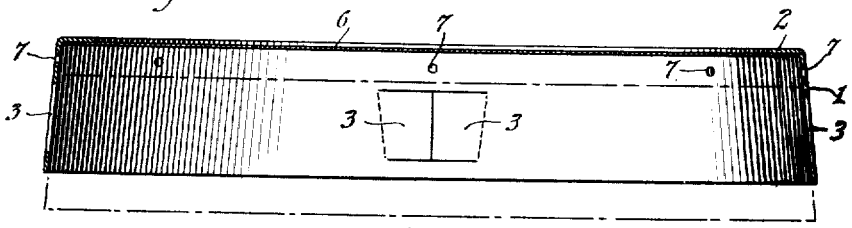
Figure 2 is a sectional view through a package disclosing an embodiment of the invention, the same being shown empty.
Figure 3:
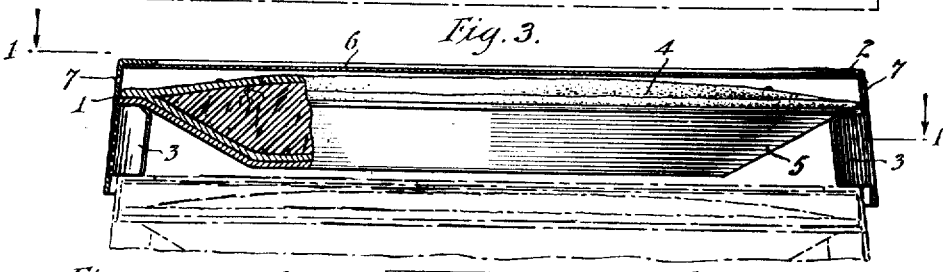
Figure 3 is a sectional view through Figure 1 on the line 3—3.

Referring to the accompanying drawing by numerals, 1 indicates the side wall of the package, which has a flange at the top formed in any desired way, as, for instance, by having the upper end turned over to form the edge portion 2 particularly shown in Fig. 2. This edge portion or flange may be of various shapes, as, for instance, flat or curled, and which in some instances acts as a platform for supporting a superimposed article. Intermediate the top and bottom of the wall 1 are arranged means for supporting a commodity-carrying member, and as shown in Figures 1 to 3, inclusive, these means are formed by a plurality of pressed-out ears 3, said ears being preferably arranged in groups and at a desired point between the top and bottom of wall 1. Wall 1 is tapered so that two or more of the packages may be nested, if desired, as shown in Figure 2 or may be stacked as shown in Figure 3.

When a pie, for instance, pie 4, is placed in a package the paper or fabric pie plate 5 is forced upwardly into substantially the position shown in Figure 3. The wall 1 is made of such a diameter that the pie plate 5 can be forced upwardly only a certain distance and will then be brought to a stop by reason of the tapering of the wall and the diameter of the pie plate. The parts are so proportioned that the pie plate will be stopped at a point immediately above the respective tabs 3, which tabs are forced inwardly as shown in Figure 3 as soon as the pie plate is in position. If the pie plate, with the pie thereon, should drop down slightly by reason of being shaken, it will rest on the various tabs 3 and thereby be held suspended within the package.

In order that the package may be sanitary and prevent dust or the like from entering, a covering 6 of Cellophane or other desired material is used, and secured to the upper portion of the wall 1, as, for instance, to the under surface of the flange 2, though under some circumstances it might be laid loosely in place. While Cellophane or other transparent material is preferable, it will be understood that an ordinary sheet of paper or other opaque or substantially opaque sheet could be used.

By reason of the construction set forth the various packages containing pies or other commodities may be readily stacked without injury to the commodities. As indicated in dotted lines in Fig. 3, a top package rests on the upper edge portion of the next lower package, and so on down to the bottom of the stack. In this way a large number of the packages may be readily stacked without the use of the racks now in common use. Where a package is held by the hand, being supported on a counter or in a stacked position, the commodity carried thereby will be suspended and will be protected against injury from dirt, dust and the like, or protected against being hanled by anyone.

For certain commodities, as, for instance, pies, a circulation of air is desirable, and, therefore, the wall 1 may be formed with any desired number of small apertures 7. Comparatively few of these apertures are sufficient to allow an ample circulation of air without allowing any appreciable amount of dust to enter.

Where a pie plate and pie have been shown and more or less described, it will be understood that the package may receive and protect a coffee ring, rolls, or other commodities without departing from the spirit of the invention. Pie plates similar to that illustrated by the numeral 5 in the drawing are old and well known and are made in several different sizes. However, each size is standard and, therefore, it is intended that the various packages shall be made of sizes to take care of the various pie plates now in common use on the market. Where a coffee ring or other commodity is placed in the package any desired supporting member may be used instead of the pie plate without departing from the spirit of the invention.

When it is desired to use a package, one of the same is removed from the stack as shown in Figure 2. When removed the tabs 3 will not extend inwardly but will readily form part of the wall 1. The pie and pie plate will then be forced upwardly until the periphery of the plate presses against the wall 1. The flanges 3 are then forced inwardly so that the parts will appear as shown in Figure 3 and the package and its commodity is then ready to be dispensed.

In the manufacture of pies and other commodities of a similar nature, it is customary in some manner to support these pies when they are displayed for sale. In many places they are placed on counters, while in other instances racks are provided which are more or less expensive. By reason of the construction shown a large number of the packages may be stacked and may at all times be ready for sale. When anyone wishes to buy a pie or the commodity that is held by the package, the pie or other commodity together with the package is sold to the purchaser for the price of the pie itself. The purchaser will then have, automatically, a protected pie which really needs no wrapping. When removing the pie the package may be broken open or, if preferred, the tabs 3 may be swung outwardly until they form part of the wall 1 from which they have been pressed. The package may then be shaken a little and the pie will automatically fall downwardly and out of the package.

Figure 4:
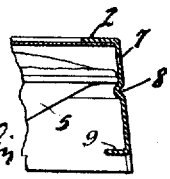
Figure 4 is a detailed fragmentary sectional view similar to one side of the showing in Figure 3, but illustrating a slightly modified construction.

Under some circumstances a slightly modified structure may be desired, namely, the structure shown in Figure 4. In this form of the invention a stiffening bead 8 is provided which is pressed inwardly and really forms part of wall 1. This bead acts in the double capacity of a stiffening and reinforcing wall and also as a shelf over which the edge of the pie plate snaps, whereby the pie plate is held against accidental downward movement. In this form of the invention the inwardly extending bead 8 acts to take the place of the supporting tabs 3. In order to cause this form of package to be capable of being stacked a number of tabs 9 are pressed inwardly from the lower edge of the wall. The stacking operation is the same as shown in Figure 3, except that the upper package will have its tabs 9 resting on the edge 2 of the lower package.

Figure 5:
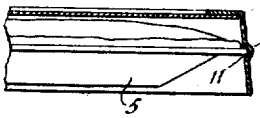
Figure 5 is a view similar to Figure 4 but showing a slightly modified structure thereto.

In Figure 5 the same general idea is found as in the preferred form, but the bead 10 is turned outwardly instead of inwardly as in Figure 4, the position thereof being intermediate the upper and lower edges of the wall 1. This structure presents a groove on the inside of the wall arranged to allow the edge of a suitable commodity-carrying support, as, for instance, pie plate 5, to be carried by the wall with the edges fitting into the groove 11. It will be understood that the angle of the annular wall may be varied as desired, and also that the groove 11 may be made of any desired shape and size. When this form of the invention is used the tabs 9 may also be used, or they may be eliminated. In certain sections of the market small pies are sold and it is desirable that these should be protected. Where this is the case they may be arranged as shown in Figure 5, but the tabs 9 are eliminated. When the pie plate 5 with a pie thereon is to be arranged in the device, the pie plate is merely pushed upwardly until it snaps into the groove 11 where it is held by the resiliency of the respective parts.

When it is desired to remove the pie plate with a pie thereon the wall is broken and pulled away so that the pie plate will drop down and rest in the hand. In this form and also in all of the forms of the invention the pie or other commodity is suspended and is fully protected by the covering structure so that it is really protected against being injured by crushing or the like and also protected against dirt, dust and the like. It will therefore be noted that the device is not only a proper mechanical support but one which is a sanitary protecting covering.

As clearly shown in Figure 3 it will be observed that the wall 1 extends below the tabs 3 so as to overlap the next adjacent package. The stacking of the packages in this way with the walls of an upper package dropping over the next package acts to prevent lateral movement in respect to the respective packages, and thus holds them properly stacked and partly nested.

We claim:

1. A package comprising an annular wall tapering outwardly from top to bottom, an inwardly extending flange carried by said wall at the upper part, a protecting sheet carried by said flange, and a pie-supporting structure pressed from said wall intermediate the height thereof.

2. A package for pies and other commodities comprising an annular wall tapering outwardly from top to bottom, an inwardly extending edge at the top, and a plurality of inwardly pressed members forming supporting tabs having upper and lower edges, said upper edges being positioned to receive and support a plate within said wall while said lower edges are positioned to rest on top of the inwardly extending edge of the next package whereby a plurality of packages may be stacked.

3. A package comprising an upstanding wall having an inturned edge and a plurality of integral tabs pressed therefrom and positioned to be swung inwardly for engaging and supporting a plate when the package is in use, said tabs being positioned to engage the flange of another package arranged therebelow whereby one package may be supported by another.

4. A package for supporting and protecting a pie or other commodity, including an enclosing slightly cone-shaped wall, means forming a window at the top of said wall, and a plurality of inwardly projecting members intermediate the top and bottom of said wall for supporting said commodity, and acting to provide supporting legs adapted to rest on the top edge of a similar shaped device whereby a plurality of packages may be stacked.

5. A package of the character described comprising a body formed integral throughout and provided with an inturned edge at the top, article-supporting means intermediate the top and bottom, and a plurality of ventilating apertures near the top.

6. A package of the character described, comprising a body formed with an annular wall having intermediate its height an integral inwardly extending member positioned to act as a support for the edge of a commodity-supporting article and a plurality of tabs at the lower part of said wall extending inwardly for supporting the packages when stacked.

7. A package, comprising an annular wall tapering outwardly from top to bottom, a protecting sheet carried by said wall at the upper edge portion and forming a cover for the package, and means pressed from said wall intermediate the height thereof for receiving and supporting a commodity-supporting member.

8. A package, comprising an upstanding wall having at its upper end an inwardly-extending support and a plurality of integral tabs pressed from said wall and positioned to be swung inwardly for engaging and supporting a plate when the package is in use, said tabs being positioned to engage the inwardly extending support of another package arranged therebelow, whereby one package may be supported by another.

9. A package for supporting and protecting pies and other commodities, including a slightly cone-shaped wall, means forming a window at the top of said wall, an article-supporting means intermediate the top and bottom of said wall for supporting said commodity and acting to provide supporting means adapted to rest on the top edge of a similar shaped device, whereby a plurality of packages may be stacked.

10. A package for supporting and protecting pies, coffee rings, and other commodities, comprising an annular wall tapering outwardly from the top to the bottom, protecting means positioned at the top of said wall, and means forming part of said wall intermediate the height of the wall for receiving and supporting an article-carrying member.

11. A package, comprising an annular wall tapering outwardly from top to bottom, an inwardly extending flange carried by said wall at the upper part, means at the upper edge portion of the wall forming a window, and means pressed from said wall presenting a holding structure for receiving and holding a commodity-carrying member.

WILLIAM JOHN DONOVAN.
CHARLES EDWARD DONOVAN.